United States Patent [19]
Anton et al.

[11] Patent Number: 4,995,688
[45] Date of Patent: Feb. 26, 1991

[54] OPTICAL FIBER DISTRIBUTION FRAME

[75] Inventors: Mark A. Anton, Minneapolis; Jory A. Steinman, Golden Valley; Paul A. Suek, Minneapolis; Wayne A. Johnson, Rosemount, all of Minn.

[73] Assignee: ADC Telecommunications, Inc., Minneapolis, Minn.

[21] Appl. No.: 388,060

[22] Filed: Jul. 31, 1989

[51] Int. Cl.⁵ .............................................. G02B 6/24
[52] U.S. Cl. ................................ 350/96.10; 350/96.20
[58] Field of Search ......................... 350/96.10, 96.20

[56] References Cited

U.S. PATENT DOCUMENTS

| | | | |
|---|---|---|---|
| 4,502,754 | 3/1985 | Kawa | 350/96.20 |
| 4,595,255 | 6/1986 | Bhatt et al. | 350/96.20 |
| 4,630,886 | 12/1986 | Lauriello et al. | 350/96.20 |
| 4,699,455 | 10/1987 | Erbe et al. | 350/96.20 |
| 4,702,551 | 10/1987 | Coulombe | 350/96.20 |
| 4,708,430 | 11/1987 | Donaldson et al. | 350/96.20 |
| 4,752,110 | 6/1988 | Blanchet et al. | 350/96.20 |
| 4,765,710 | 8/1988 | Burmeis | 350/96.20 |
| 4,805,980 | 2/1989 | Mackenroth | 350/96.21 |
| 4,818,054 | 4/1989 | George et al. | 350/96.20 |
| 4,834,486 | 5/1989 | Walker | 350/96.20 |
| 4,840,449 | 6/1989 | Ghandeharizadeh | 350/96.20 |
| 4,861,134 | 8/1989 | Alameel et al. | 350/96.20 |

Primary Examiner—John D. Lee
Assistant Examiner—Phan T. Heartney
Attorney, Agent, or Firm—Merchant, Gould, Smith, Edell, Welter & Schmidt

[57] ABSTRACT

An optical fiber distribution frame is disclosed which includes a plurality of modular cabinets. The plurality of cabinets includes a connector cabinet having a front panel with sleeve adaptors for mounting a plurality of connector sleeves on said panel at an angle to said panel.

11 Claims, 15 Drawing Sheets

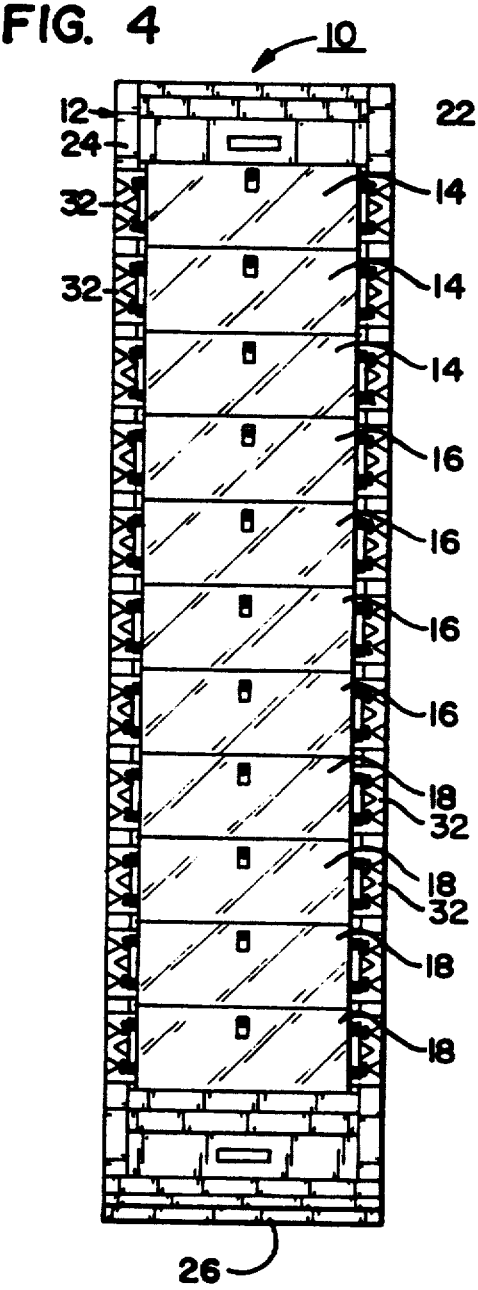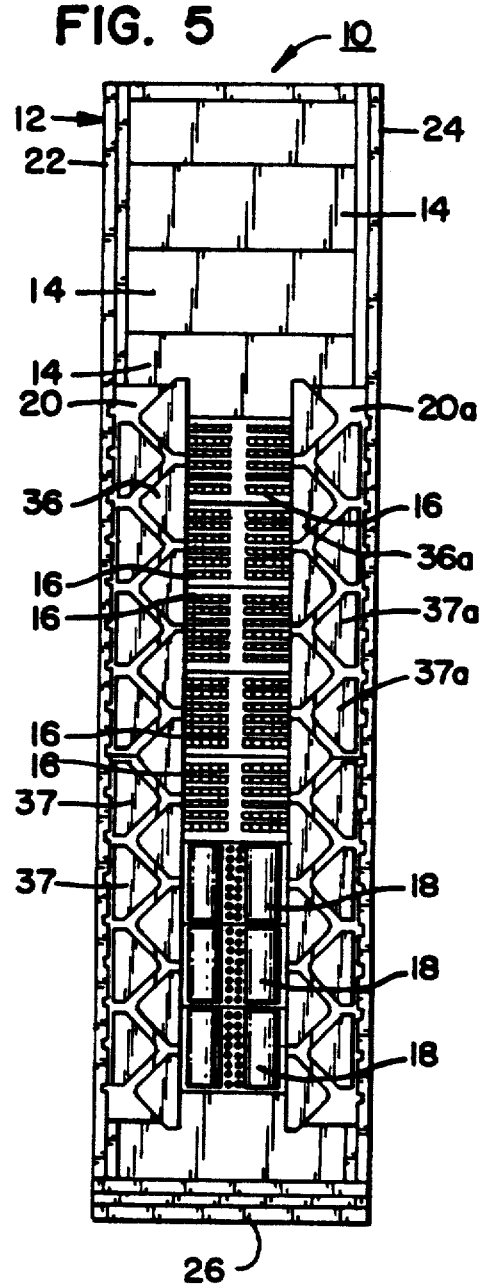

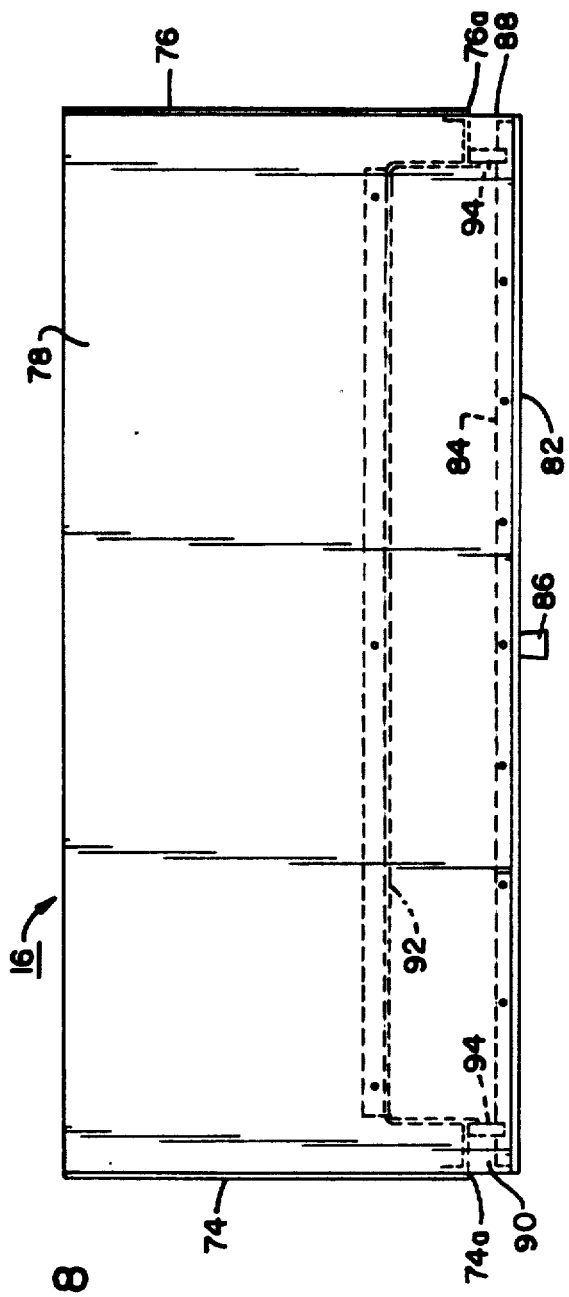
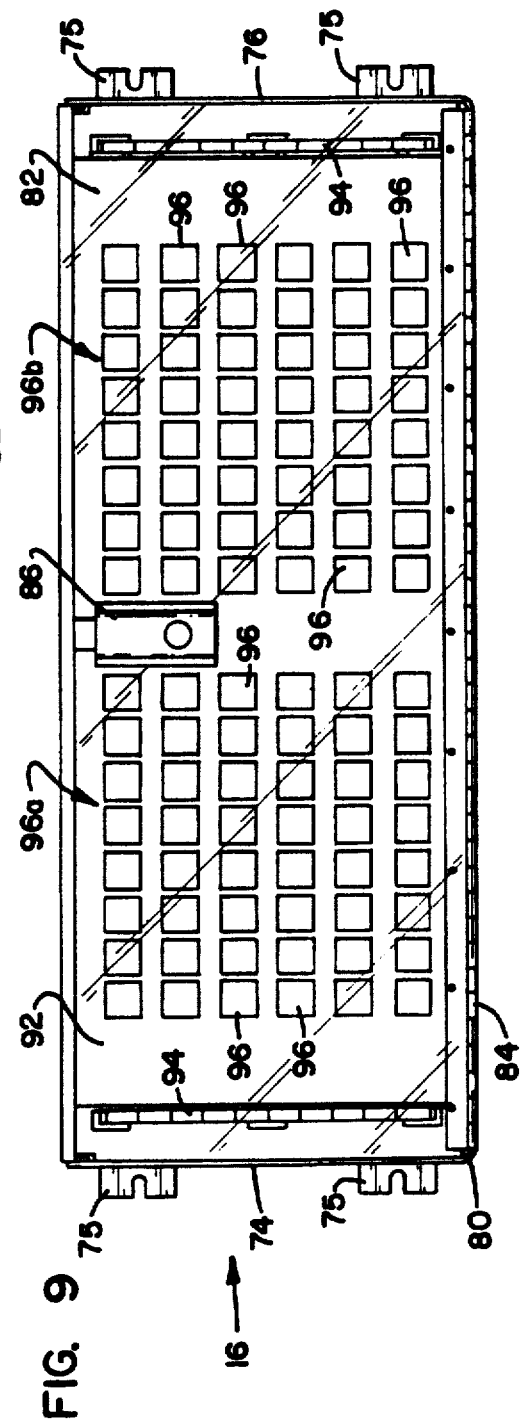
FIG. 8
FIG. 9

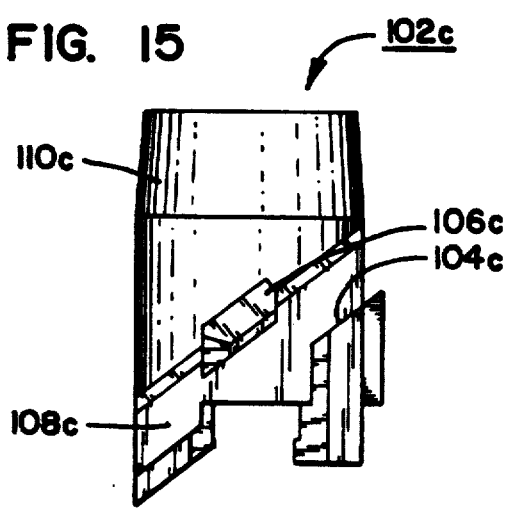
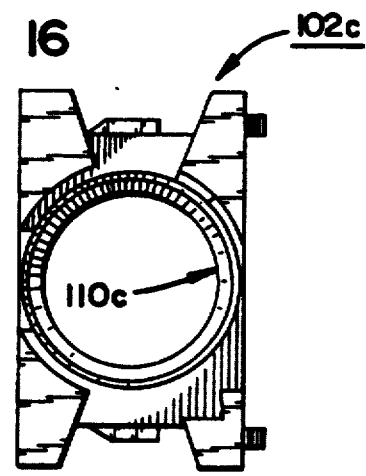
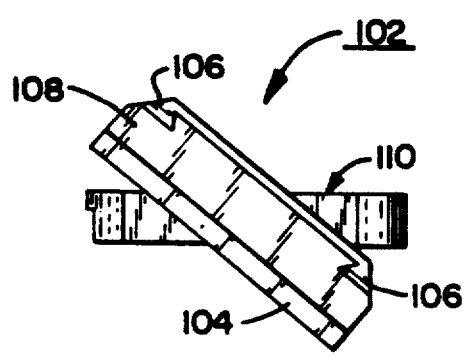
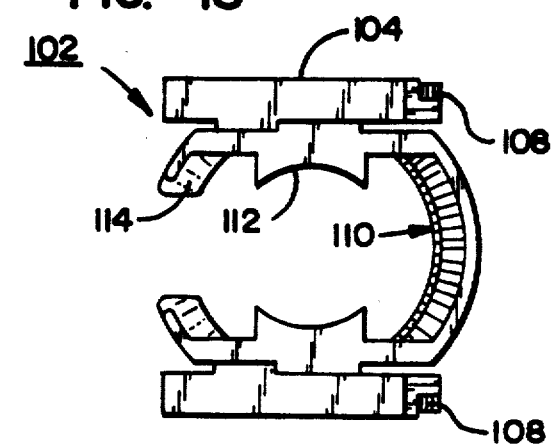
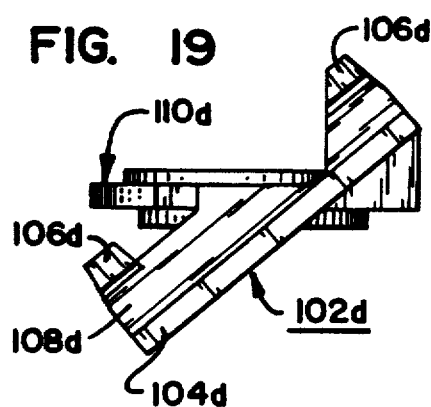
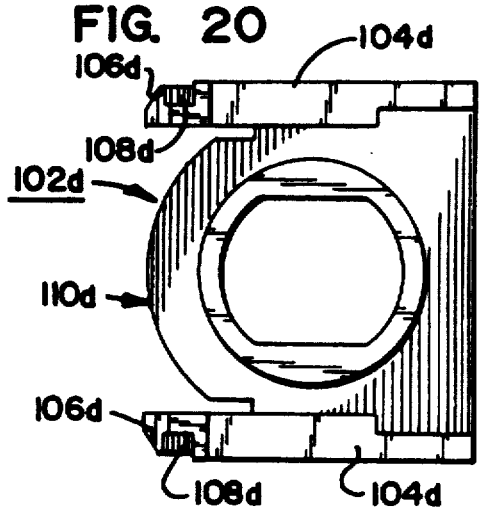

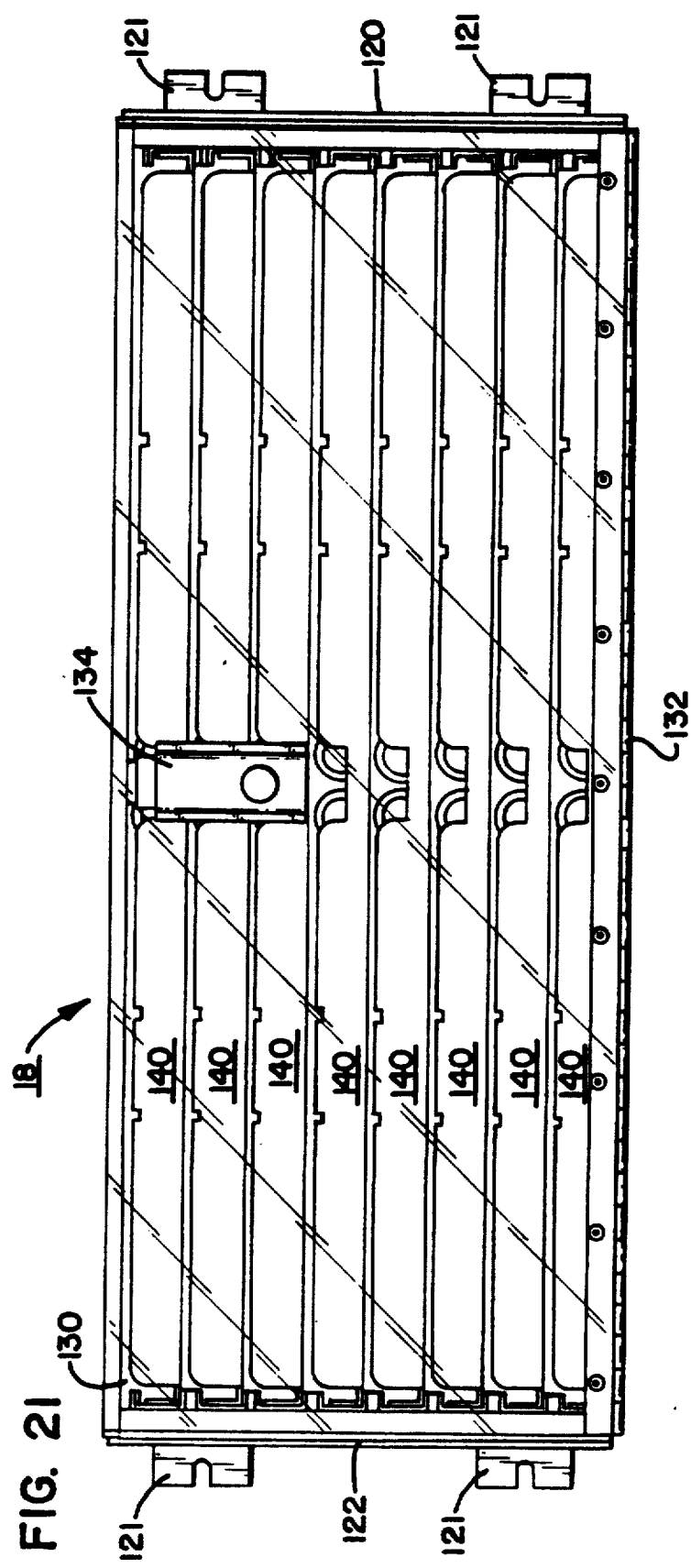

OPTICAL FIBER DISTRIBUTION FRAME

BACKGROUND OF THE INVENTION

1. Field of the Invention

This invention pertains to signal transmission systems with signals carried over optical fibers. More particularly, this invention pertains to a fiber distribution frame for use with an optical fiber signal transmission system.

2. Description of the Art

The increased use of optical fiber transmission in the telecommunications industry has resulted in a need for the development of optical fiber termination equipment. Certain equipment has been developed to respond to this need. For example, U.S. Pat. No. 4,502,754 describes an optical fiber interconnection mechanism. Also, U.S. Pat. No. 4,765,710 teaches a distributing frame for optical wave guides. U.S. Pat. No. 4,834,486 teaches an adaptor for mounting a variety of fiber optic connector sleeves to a panel.

Notwithstanding prior design efforts, the optical fiber signal transmission industry is in continued need of new designs of optical fiber distribution equipment. Industry users require systems which can address a variety of functional requirements as well as permit the user to customize distribution equipment to a customer's particular needs. It is a object of the present invention to provide an optical fiber distribution frame which meets these and other needs of the telecommunications industry.

II. SUMMARY OF THE INVENTION

According to a preferred embodiment of the present invention, a fiber distribution frame is disclosed which includes a plurality of modular cabinets including a novel optical fiber cross-connect cabinet. The cross-connect cabinet includes a front panel having a plurality of openings for receiving any one of a plurality of designs of fiber optic connector sleeve adaptors. The connector sleeve adaptors are mounted into two fields. Adaptors in a first field on a left side of the panel are angled toward the left side of the panel. Similarly, adaptors mounted on a right side of the panel are angled toward the right side of the panel. The cross-connect cabinet facilitates organized management of fiber optic cables. The frame is modular such that each one of the modularized cabinets can be removed and replaced with the other modularized cabinets of different function. The frame includes means for organizing and managing fiber optic cables.

III. BRIEF DESCRIPTION OF THE DRAWINGS

FIG. 4 is a front elevation view of a frame of FIG. 2 (shown lengthened to accommodate a greater number of modular cabinets) with a plurality of different modular cabinets installed within the frame;

FIG. 5 is a rear elevation view of the fiber distribution frame of FIG. 4;

FIG. 8 is a top plan view of a connector module for use with the present invention;

FIG. 9 is a front plan view of the module of FIG. 8;

FIG. 15 is a side elevation view of a third connector sleeve adaptor for use with the connector panel of FIG. 10;

FIG. 16 is a front plan view of the adaptor of FIG. 15;

FIG. 17 is a side elevation view of a fourth connector sleeve adaptor for use with the panel of FIG. 10;

FIG. 18 is a front plan view of the adaptor of FIG. 17;

FIG. 19 is a fifth connector sleeve adaptor for use with the panel of FIG. 10;

FIG. 20 is a front elevation view of the adaptor of FIG. 19;

FIG. 21 is a front elevation view of a splice module for use with the present invention;

IV. DESCRIPTION OF THE PREFERRED EMBODIMENT

A. Generally

Referring now to the several drawing figures in which identical elements are numbered identically throughout, a detailed description of the preferred embodiment of the present invention will now be described.

Figure 1:
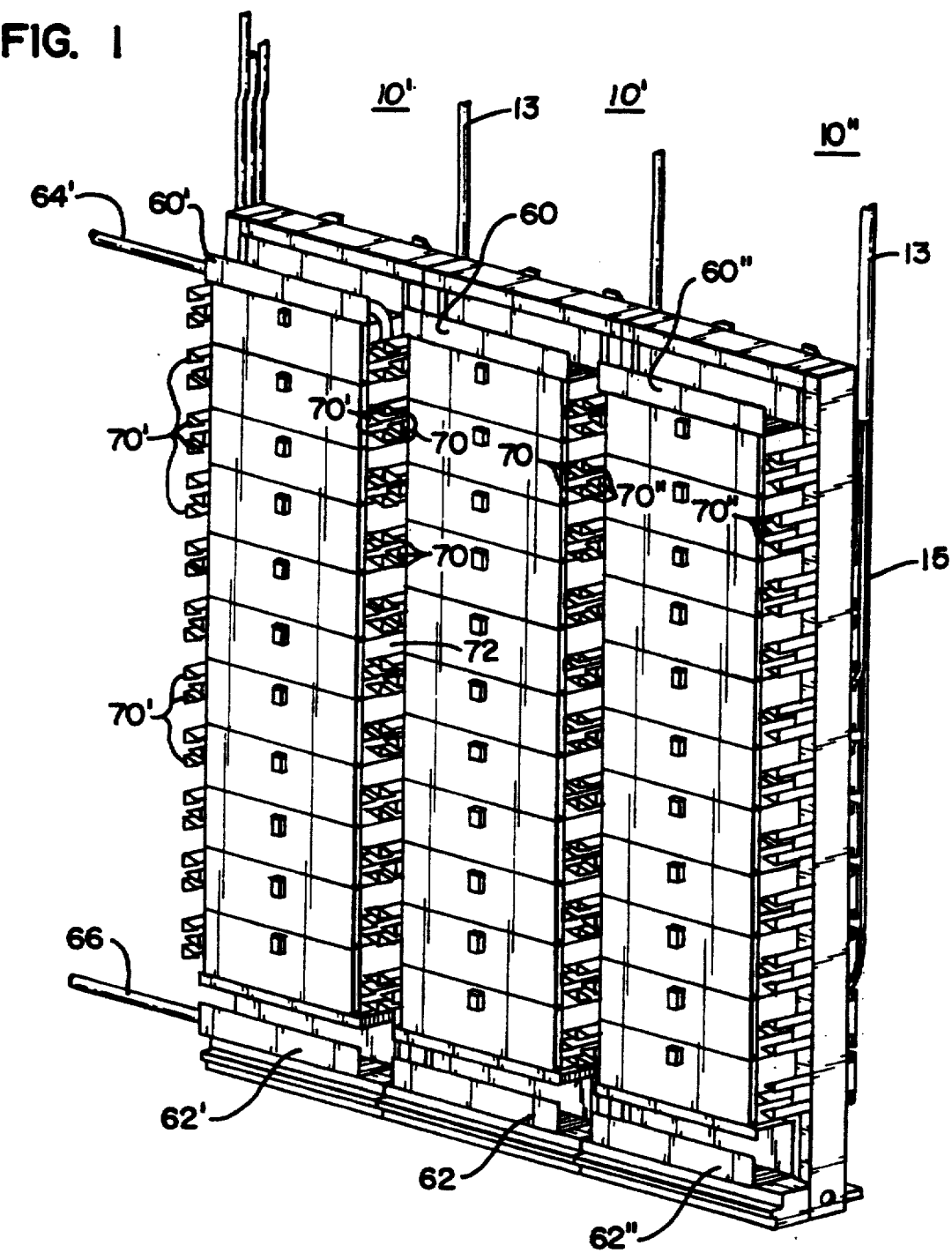
FIG. 1 is a front, right side and top perspective view of three fiber distribution frames mounted in side-by-side relation and made according to the teachings of the present invention.

In FIG. 1, three optical fiber distribution frames are shown generally at 10, 10', and 10". Each of frames 10, 10′, and 10″ are identical and a description of one will suffice as a description of the other.

FIG. 4 shows, in front elevation, optical fiber distribution frame 10. FIG. 5 shows the same frame 10 but showing the back view thereof.

B. Frame Member

Fiber distribution frame 10 includes a rigid structural frame member 12 which carries a plurality of modular cabinets which may be interchanged and mixed at the option of a user of the product. As shown in FIGS. 4 and 5, the frame member 12 carries three optical fiber storage modules 14, five optical fiber connector modules 16 and three optical fiber splice modules 18.

With the benefit of the teachings of the present invention, one skilled in the art will recognize that the particular number and arrangement of storage modules 14, connector modules 16 and splice modules 18 as shown in FIGS. 4 and 5 may be widely varied and permutated at the option and convenience of the user. For example, an entire frame member 12 may include only storage modules 14, only connector modules 16 or only splice modules 18. Also, the number and variety of such modules may be intermixed at the discretion of the user.

For reasons that will become apparent, as shown in FIG. 5, optical fiber distribution guide strips 20, 20a are provided on the rear sides of frame member 12 in the area of connector modules (or cabinets) 16 and splice modules (or cabinets) 18.

Figure 7:
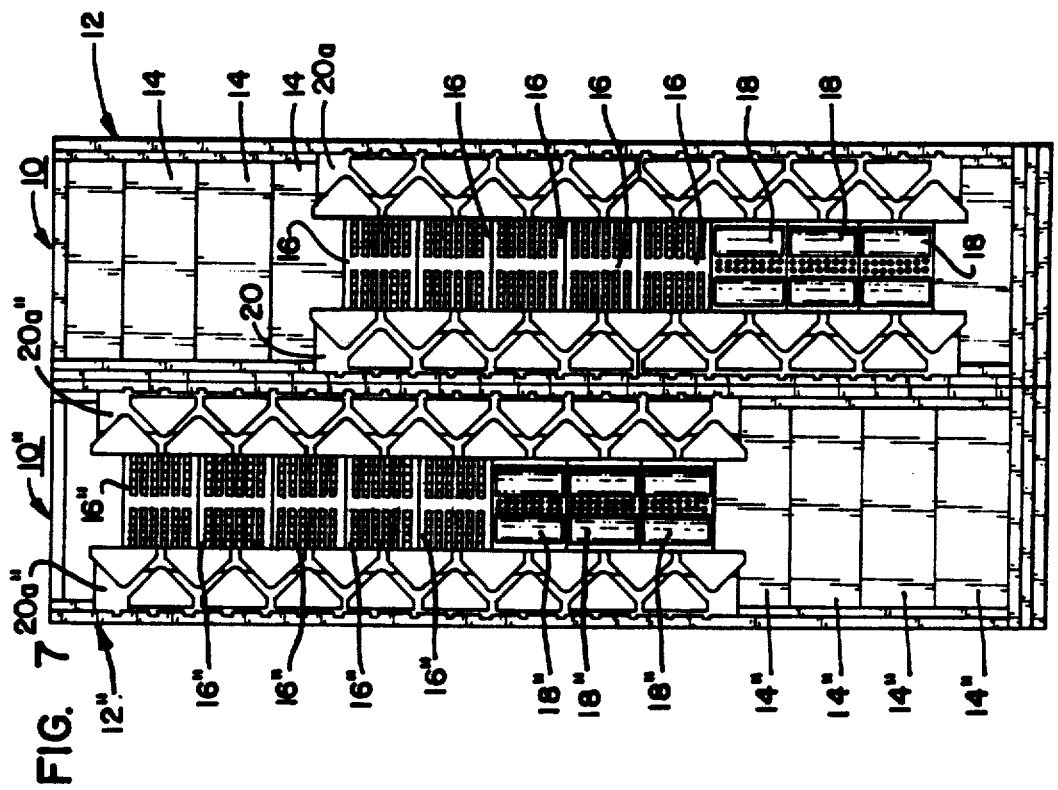
FIG. 7 is a rear elevation view of the fiber distribution frames of FIG. 6.
Figure 6:
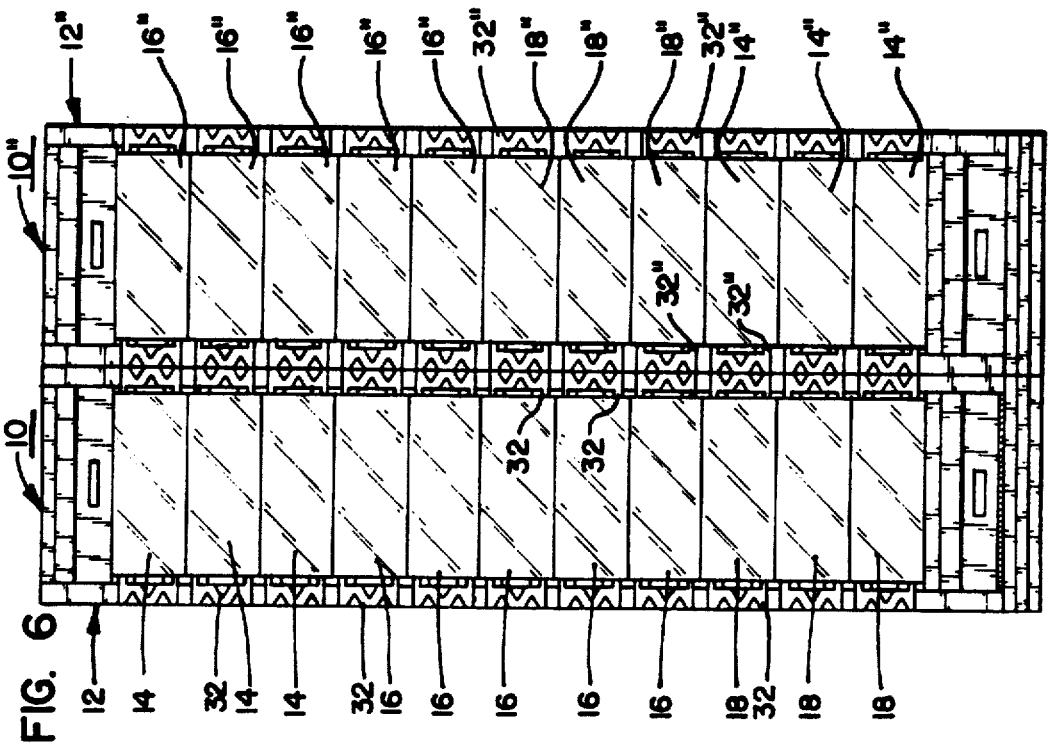
FIG. 6 is a front elevation view of two fiber distribution frames in side-by-side relation.

To illustrate the modularity and versatility of the design, FIGS. 6 and 7 show in front and rear elevation, respectively, fiber distribution frames 10 and 10″. Shown best in FIG. 7, the reader can see how cabinets 14, 16 and 18 have been rearranged within frame 12″ to present a different permutation of cabinets as that shown in frame 12. The difference in arrangement of cabinets between frames 10 and 10″ is not readily apparent in FIG. 6 since, as will be described, all cabinets have similar front covers for sake of appearance. Such covers are not essential.

Referring back now to FIGS. 2 and 3, the frame member 12 for use in the optical fiber distribution frame 10 will now be described. Frame member 12 includes right sidewall 22 and left sidewall 24 which are spaced apart and rigidly connected by bottom frame wall 26 and top frame wall 28. Walls 24, 22, 26 and 28 are rigidly connected to define a generally rigid, hollow rectangular box defining a frame interior 30. The construction of frame member 12 thus described is standard. Pairs of aligned mounting brackets 32 are secured to the forward edges of sidewalls 22 and 24. As will be more fully described, mounting brackets 32 receive and hold the modular cabinets 14, 16 and 18.

Figure 3:
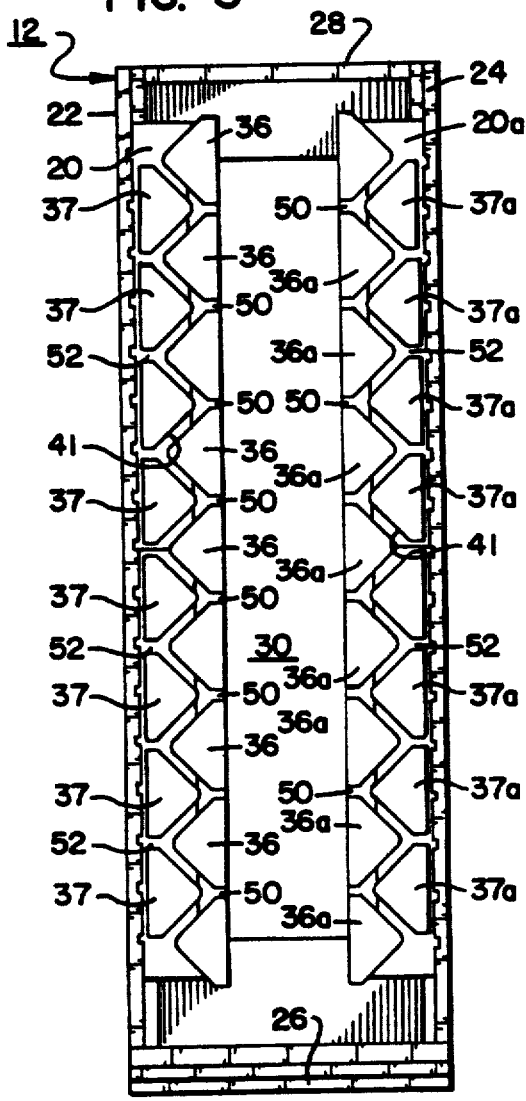
FIG. 3 is a rear elevation view of the frame of FIG. 2.

On the rear edges of sidewalls 22, 24 are mounted the optical fiber distribution guide strips 20, 20a. Unlike the guide strips of FIG. 5, the guide strips of FIG. 3 are shown extending the entire length of frame member 12. In most applications, strips 20, 20a are only required in the region of connector cabinets 16 and splice cabinets 18. The are not required in the region of storage cabinets 14 for reasons that will become apparent.

Each of guide strips 20, 20a includes a flat, elongated plate 34, 34a which is secured through any suitable means (not shown) to sidewalls 22, 24. On each of plates 34, 34a plurality of fiber guides including inner guide 36, 36a and outer guides 37, 37a are mounted in offset straight vertical columns as shown in FIG. 3.

Figure 26:
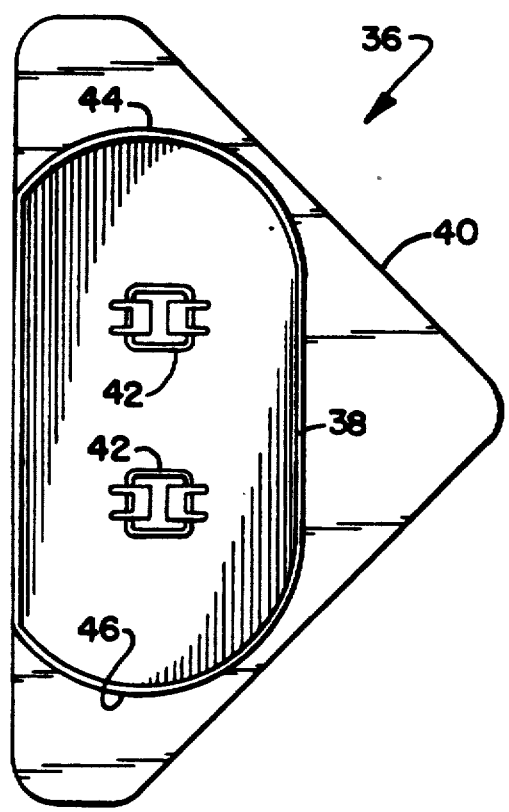
FIG. 26 is a plan view of an optical fiber guides for use on the frame of FIG. 3.

Each of guides 36, 36a, 37, 37a are identical. With reference to FIG. 26, a singular fiber guide 36 is shown. The fiber guide 36 includes a generally oval shaped pillar 38 and a triangular shaped cover plate 40. Attachment clips 42 are provided within pillar 38 for clipping the fiber guide 36 into aligned holes (not shown) in plate 34.

Figure 27:
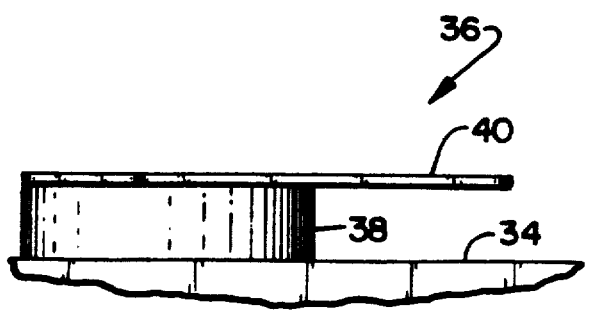
FIG. 27 shows a fiber guide mounted on a mounting plate.

The pillar 38 spaces plate 40 from plate 34 (as shown in FIG. 27). The pillar 38 has rounded top and bottom surfaces 44, 46 which are radiused to present a minimum bending to which an optical fiber may be subjected without substantial risk of harm to the fiber. It is recognized within the industry that a radius of 1.5 inches corresponds to a desired minimum bending radius.

When mounted on the plate 34, the fiber guides 36 present opposing surfaces which define a plurality of cable pathways through the guide strips 20, 20a. These include horizontal frame exit pathways 50 defined between opposing surfaces of radiuses 44, 46 of guides 36, 36a. Similarly, entrance fiber pathways 52 are defined between opposing surfaces of radiuses 44, 46 of fiber guides 37, 37a. Pathways 50 and 52 are in direct communication with each other. Opposing surfaces of cover plates 40 define axial openings 41 which permit direct access to pathways 50 and 52 through the rear face of guide strips 20 and 20a.

With the structure of the guide strips 20, 20a as thus described, fiber optic cables can be accessed to the rear of member 12. Cables (such as rear cables 13 in FIG. 1) are directed from along the top of frame member 12 to guides 36 and 36a. Cable clamps 400 (only one of which is shown in FIG. 3A) are attached to plates 34, 34a (which, in turn, are attached to sidewalls 22, 24) by mounting brackets 402. The clamps 400 hold the cable 13 at an angle to the strips 20, 20a. Thereby, the clamps 400 direct optic fibers to guide 36, 36a with minimum bending of the fibers. Individual optic fibers 15 (commonly carried in tubed bundles of 12 fibers per tube) from the cable 13 may be directed through horizontal passages 50, 52 to the rear of the cabinets (not shown in FIGS. 2 or 3) carried by frame member 12.

When desired to pass fibers 15 to an adjacent frame, the fibers may be threaded through passages 50, 52. The radiused surfaces 44 and 46 prevent undue overbending and possible damage to the fiber optic cable.

Shown in FIG. 1, the forward face of top wall 28 is provided with an upper trough 60. Similarly, bottom wall 26 is provided with a lower trough 62. Troughs 60, 60′ and 60″ are aligned to define a pathway to retain a fiber optic cables 64 along the top of frames 10–10″. Troughs 62–62″ are aligned to define a pathway to retain cables 66 along the bottom of panels 10–10″. Cables carried in troughs 60, 62 will be individual patch cords.

Figure 2:
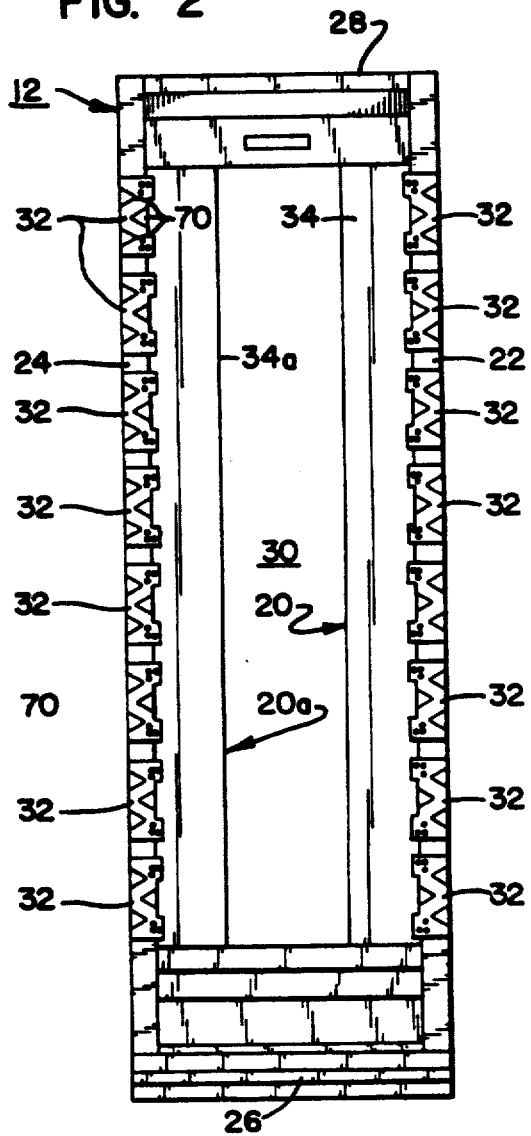
FIG. 2 is a front elevation view of a frame member without modular units installed.
Figure 3A:
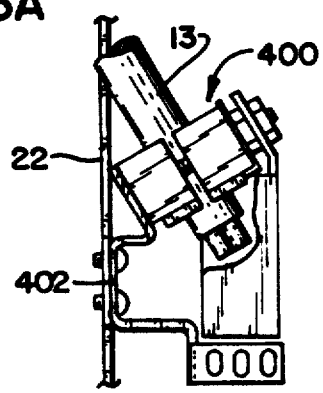
FIG. 3A is a view taken in elevation of a mounting clip for mounting a fiber optic cable to the frame of FIG. 3.

Referring to FIGS. 1 and 2, each of mounting plates 32 carries three triangularly aligned and spaced apart fiber guide clips 70. Shown best in FIGS. 1 and 6, the guide clips 70 guide the cables 64, 66 from either of troughs 60 or 62 into the vertical spaces 72 defined between opposing and adjacent panels 10 and 10″. The spaced apart clips 70 permit individual fibers to be fed from the vertical space 72 inwardly to the cabinets 14, 16 or 18 mounted on the frame member 12.

C. Modular Cabinets

As previously mentioned, three modular cabinets are provided for use with frame member 12. The three styles of cabinets include a storage cabinet 14, connector cabinet 16 and splice cabinet 18.

1. Cross-Connect Cabinet

FIGS. 8 and 9 show a cross-connect cabinet 16 for use with the present invention. Cabinet 16 includes rigid metal sidewalls 74, 76 each having mounting plates 75. Sidewalls 74, 76 are joined by a top wall 78 and bottom wall 80. A partially opaque forward wall 82 is provided covering the forward face of cross-connect cabinet 16. Forward wall 82 includes a bottom hinge 84 for pivotally connecting forward wall 82 to bottom wall 80. A commercially available latch 86 is provided for releasably latching the top edge of forward wall 82 to top wall 78.

Shown best in FIG. 8, the forward edges 74a, 76a of sidewalls 74, 76 do not extend to forward wall 82. Instead, they are spaced from forward wall 82 to provide right and left sidewall entrance gaps 88, 90 for passage of fiber optic cables from the sides of cabinet 16 through gaps 88, 90 into the interior of cabinet 16.

As shown in FIGS. 8 and 9, cross-connect cabinet 16 is hollow and does not include a back wall. As a result, it is accessible through both the back and the front (when the front wall 82 is pivoted to the down position).

Retained within the interior of cabinet 16 is a connector panel 92 which is spaced from forward wall 82. On opposite sides of panel 92 and disposed within gaps 88, 90 are fanning clips 94 for maintaining vertical spacing of fiber optic cables passing through edges 88, 90.

Figure 10:
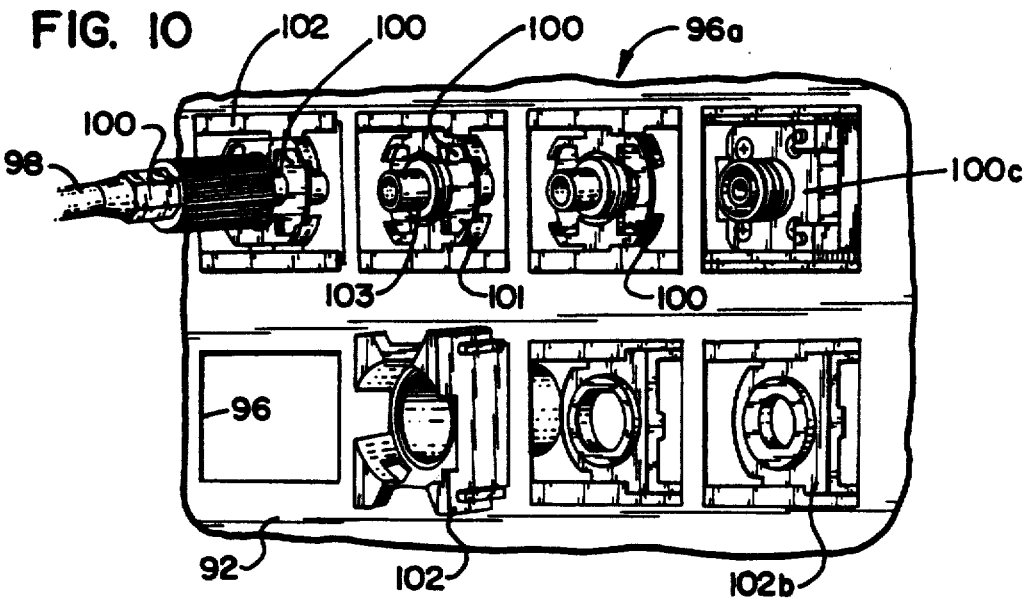
FIG. 10 is a front plan view of a connector panel of the module of FIGS. 8 and 9.
Figure 11:
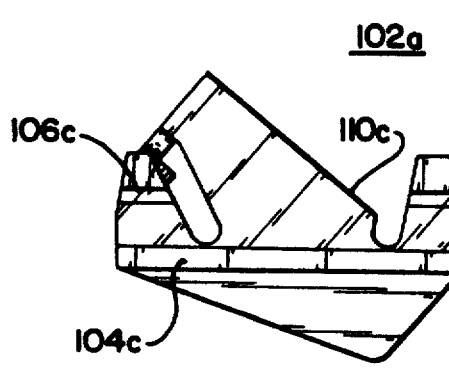
FIG. 11 is a side elevation view of a first connector sleeve adaptor for use with the connector panel in FIG. 10.
Figure 12:
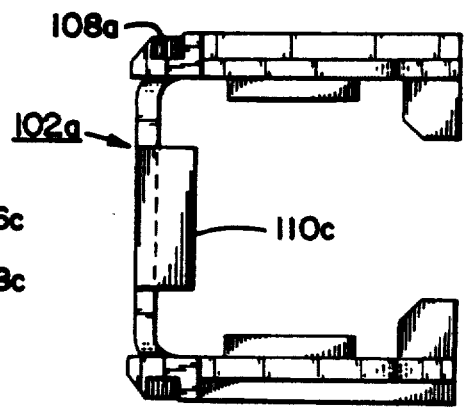
FIG. 12 is a front plan view of the adaptor of FIG. 11.
Figure 13:
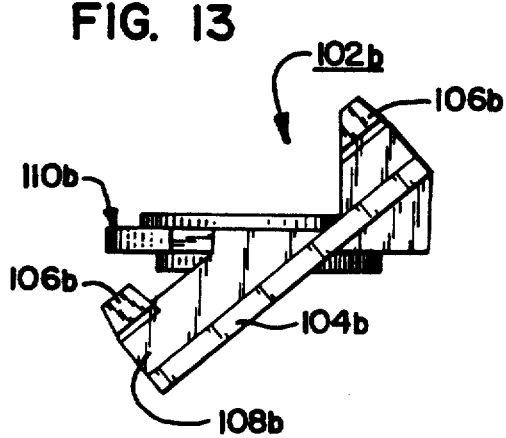
FIG. 13 is a side elevation view of a second connector sleeve adaptor for use with a connector panel of FIG. 10.
Figure 14:
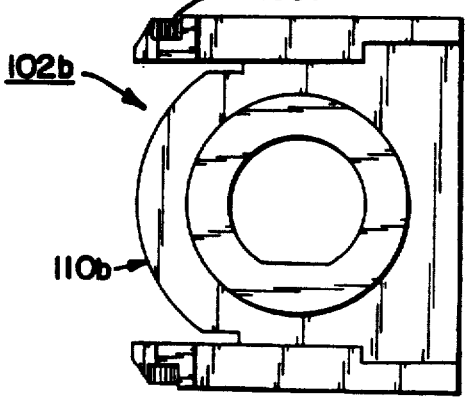
FIG. 14 is a front plan view of the adaptor of FIG. 13.
Figure 22:
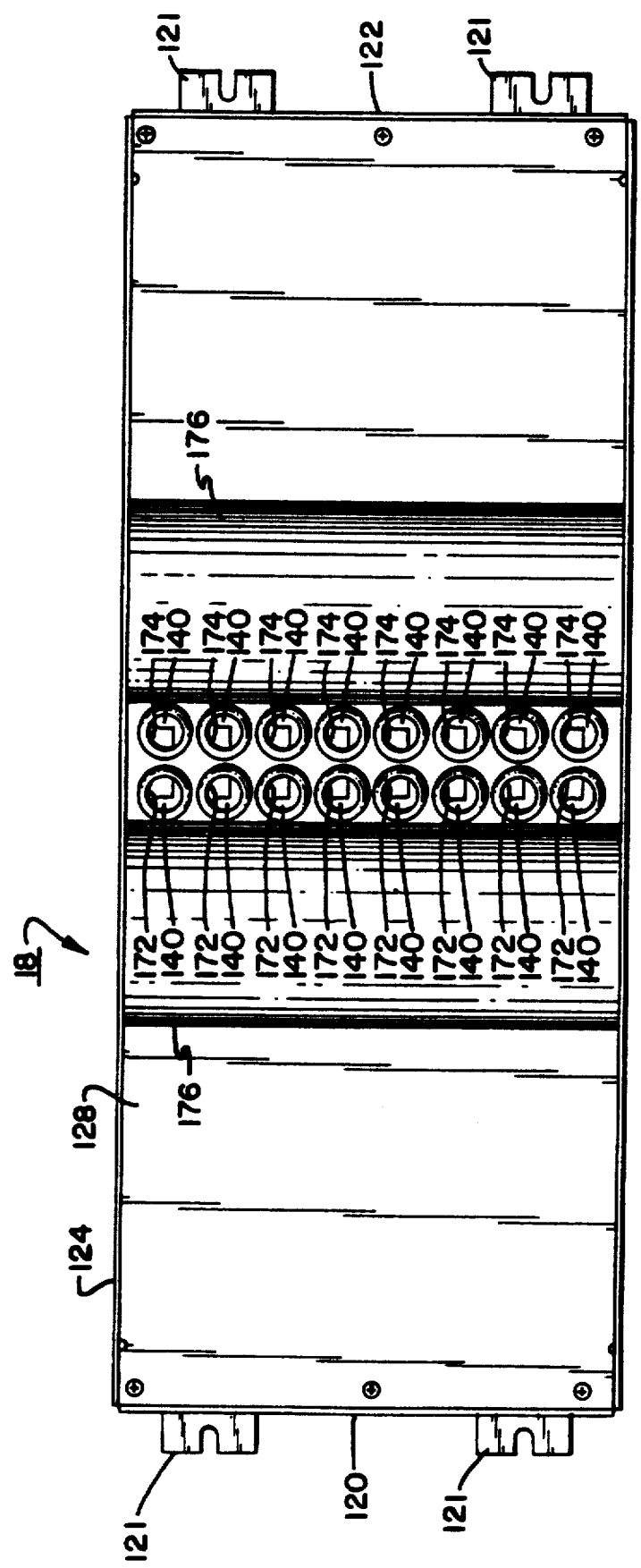
FIG. 22 is a rear elevation view of the module of FIG. 21.
Figure 23:
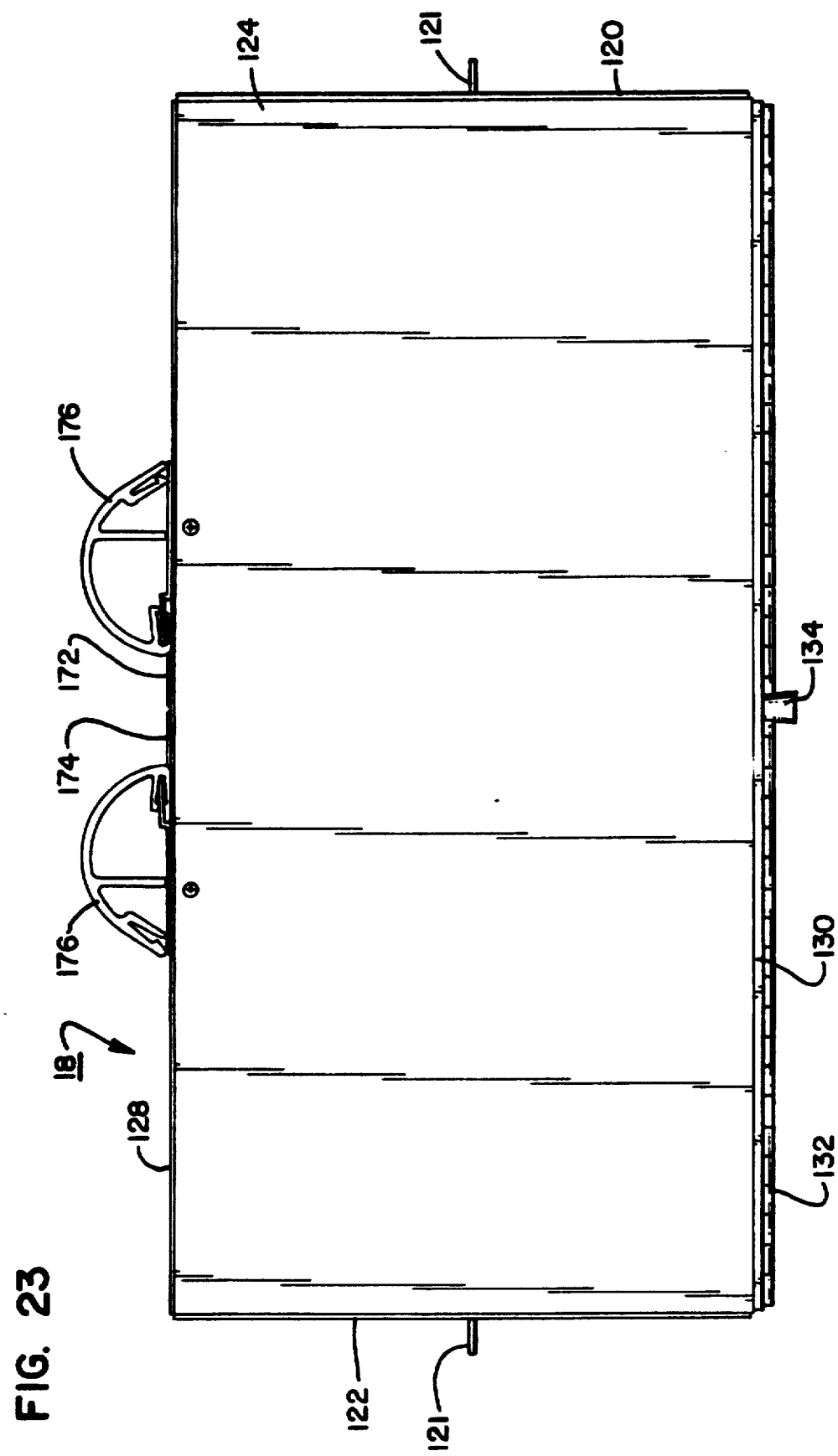
FIG. 23 is a top plan view of the module of FIG. 21.

Shown best in FIGS. 9 and 10, connecting panel 92 includes a plurality of square shaped openings 96 formed therethrough. The openings are arranged in a left field 96a and a right field 96b disposed on opposite sides of the center of connector panel 92 (when viewed in FIG. 9). Each of fields 96a and 96b includes six rows of eight holes 96. It will be appreciated that the alignment, number of holes and number of rows is illustrative and could vary while retaining the essence of the present invention.

Holes 96 receive any one of a plurality of connector sleeve adaptors (shown only in FIG. 10 received within holes 96). In FIG. 10, a sheathed optic fiber 98 is shown terminating at a connector 100. There are a wide variety of commercially available designs of connectors 100.

Commercial manufacturers of such connectors 100 as well as other suppliers manufacture metal connector sleeves such as sleeves 100a through 100d. In practice, the commercially available metal sleeves 100a-100c would be mounted on flat surfaces with the connectors 100 presenting an axis generally perpendicular to the plane of the surface to which they would be mounted.

The present invention utilizes a plurality of connector sleeve adaptors such as adaptor 102 to receive the commercially available connectors 100 and mount them within connector panel 92 at an orientation such that the axis of connectors 100 are at about a 45° angle with respect to the plane of connector panel 92. A separate coupling adaptor is required for each commercially available connector sleeve.

U.S. Pat. No. 4,834,486 teaches an adaptor for mounting sleeves of different shapes to a panel having holes. In U.S. Pat. No. 4,834,486, it appears the adaptor mounts the sleeves to the panel in a manner such that connectors will be at 90° to the panel.

As shown in U.S. Pat. No. 4,834,486, providing adaptors having means for attachment to commercially available connector sleeves is within the scale of the art. Accordingly, the specific attachment member of the individual adaptors 102-102d will not be described in detail to avoid limitation of the present inventions to the specific adaptor shown. However, the reader will note that each of the adaptors 102-102d includes a mounting plate 104 spaced from an opposing mounting clips 106. The mounting clips 106 are spaced from mounting plate 104 to define a mounting slot 108. Slot 108 is sized to snugly receive the thickness of connector panel 92. The clips 106, slots 108 and plate 104 cooperate to defining a mounting structure. The mounting structure is snapped into place within holes 96 by an operator forcing clips 106-106d through hole 96 where the resilient clips snap back to position capturing plate 92 between clips 106 and plate 104.

Connected to each of the mounting structures is an adaptor structure shown generally at 110-110d. The adaptor structures 110-110d are uniquely configured to receive and retain commercially available connector sleeves and connectors. Each of the adaptor structure 110-110d is connected to the mounting structure such that the access of a connector attached to the adaptor structure 110-110d will be at approximately a 45° angle with the plane of slots 108-108d. Since each of the adaptor structures shown is illustrative and not exhaustive of the possible adaptors which could be provided, a description of adaptor 102 only will be illustrative. In adaptor 102, the adaptor structure 110 has opposing retaining surfaces 112 and 114 which receive and retain a plate 101 of sleeve 100. The attachment cylinder 103 is 90° to plate 101 and hence 45° to panel 92.

With the cross-connect cabinet 16 of the present invention, a wide variety of sleeve adaptors 102 can be used. Each of holes 96 is filled with a desired adaptor 102 so that a desired sleeve adaptors 102 can be utilized. The operator inserting the sleeve adaptors 102 can rotate the adaptors 102 so that they angle either to the left or to the right depending on whether they are to be inserted within holes of fields 96a or 96b. So inserted, all optical fiber connectors attached to field 96a angle towards the left (when viewed in FIG. 9) and all connectors attached to field 96b angle to the right.

The optical fibers are carried downwardly from troughs 60 through vertical space 72. The fibers (not shown) are passed through gaps 90 and 88 through fanning clips 94 and connected at the desired angle to the selected adaptors 102. The 45° angled connector adaptor 102-102d prevent over bending of fibers passing from gaps 88, 90 to adaptors 102. The angle also allows the connectors to be placed closer to the front of the module permitting easier access. Also, the angled connectors are easier to grip.

The rear portion of the connector adaptors 100 (not shown) are accessible through the back surface by an operator facing the back wall fiber distribution panel (such as the walls shown in FIG. 7). In such connections, optical fibers from cables 13 are routed through gaps 52, 50 and passed and connected to the rear of the couplings. It is anticipated that the rear access connections would be generally permanent while forward access couplings (made by opening forward wall 82) may be changed from time to time to make desired cross-connecting operations.

2. Splice Cabinet

Connector cabinet 16 adequately addresses the cross-connect function necessary for an optical fiber distribution frame. However, commonly, the users of such equipment desire splicing functions to be readily available. To this end, an optical fiber splice cabinet 18 is provided.

Shown best in FIGS. 21-24, the splice cabinet 18 includes sidewalls 120, 122, top and bottom walls 124, 126 and back wall 128 cooperating to define an enclosed box structure. Sidewalls 120, 122 are provided with plates 121 for attachment to mounting plates 32 (see FIG. 2) with cabinet 18 received within space 30. A partially opaque forward wall 130 is pivotally secured by hinge member 132 to bottom wall 126 and connected through any suitable commercially available latch member 134 to top wall 124. For purposes of aesthetics, it is preferred that forward wall 130 be designed to be compatible or nearly identical in appearance to wall 82 of cross-connect cabinet 16.

FIG. 21 shows the front of cabinet 18 with a plurality of splice trays 140 viewable through the translucent front wall 130. As shown in FIG. 21, eight identical trays 140 are shown disposed within cabinet 18 for slidably retraction by an operator through the front of cabinet 18 when wall 132 is pivoted to a down position. It will appreciated that the number and arrangement of trays 140 may be varied while still retaining the essence of the present invention.

Figure 24:
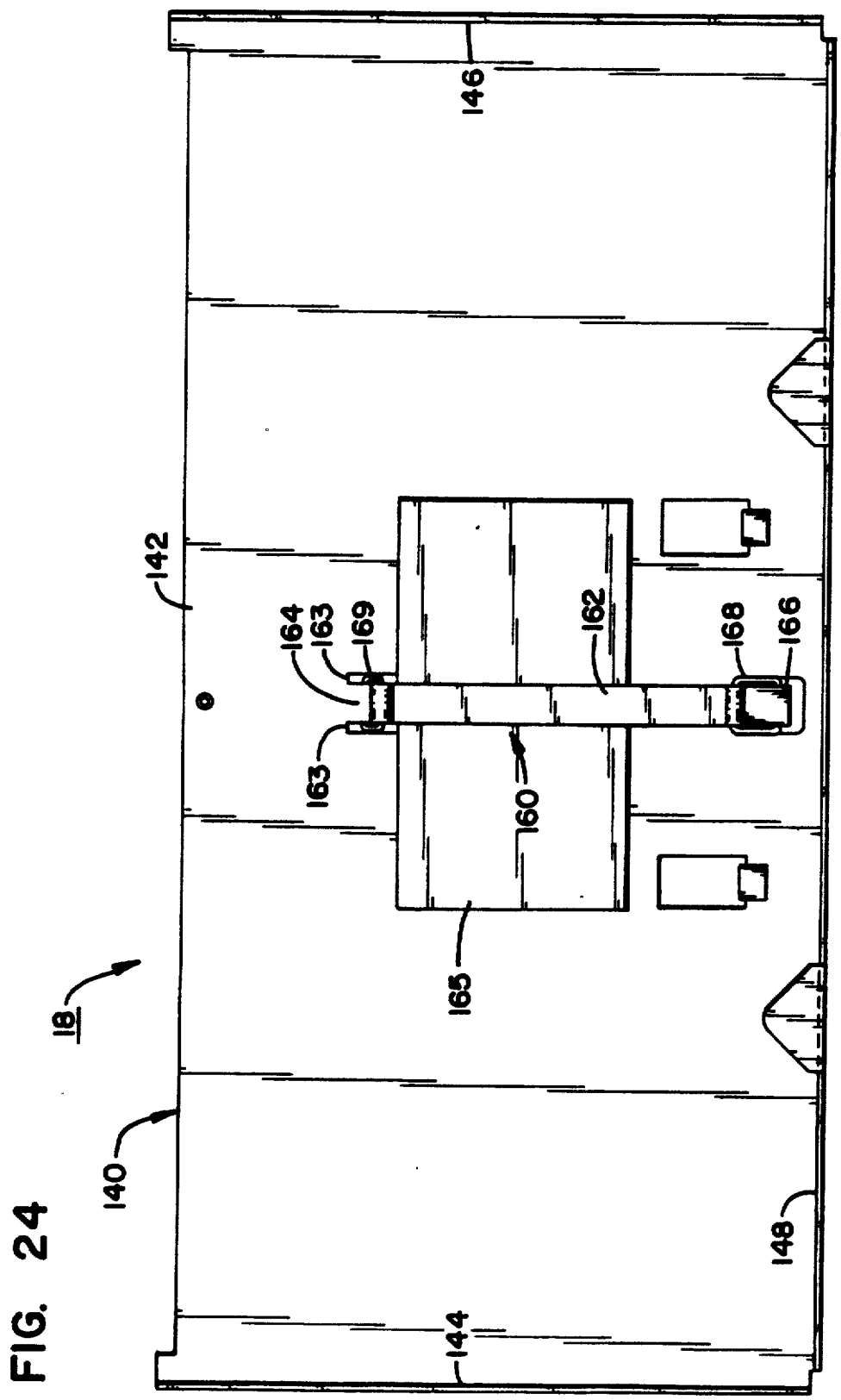
FIG. 24 is a top plan view of a splice tray for use with the module of FIG. 21.

FIG. 24 shows a tray 140. With combined reference to FIGS. 21, 24 and 28, it can be seen that the tray 140 includes a flat bottom wall 142 and upwardly curved side edges 144, 146. Also, forward edge 148 is upwardly curved.

Figure 28:
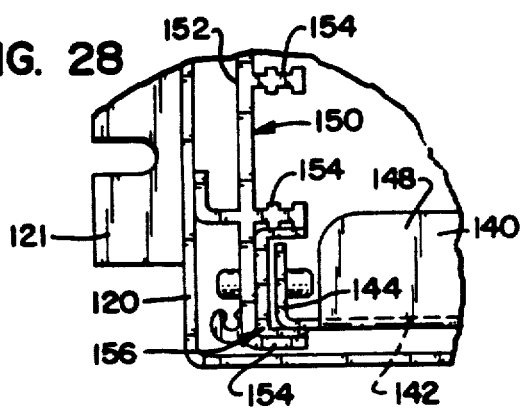
FIG. 28 is an enlarged view of the slide compartment of the tray of FIG. 21.

The sidewalls 120, 122 of cabinet 18 are provided with internal slide mechanisms 150 (best shown in FIG. 28). The slide mechanism 150 includes a vertical wall 152 and a plurality of spaced apart horizontal rails 154. A generally U-shaped slide channel 156 is received between rails 154. Slide channel 156 is preferably formed from nylon and is secured in place between opposing surfaces of rails 154. U-shaped slide channel is sized to receive side edge 144. Bottom plate 142 is slidably received against an opposing surface of U-channel 156 such that tray 140 may be pulled out of cabinet 18.

Figure 25:
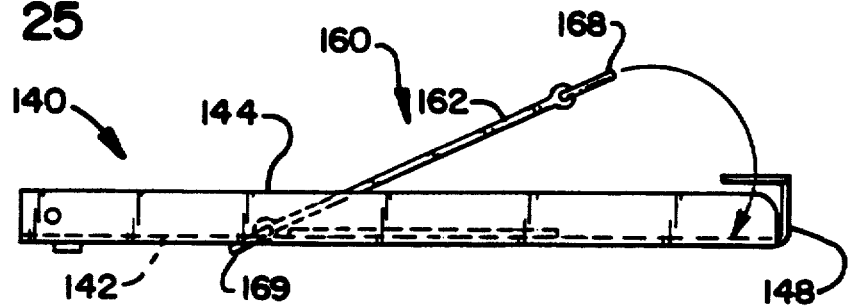
FIG. 25 is a side elevation view of a tray of FIG. 24 showing an elastic strap being positioned.

Tray 140 carries a retaining strap 160 (see FIGS. 24, 25) which include a first elastic strap 162 extending between rings 168, 169. Ring 169 is received in slots 163 and secured on plate 164. Strap 162 is resiliently stretched between plate 164 and clip 166 and retained by ring 168 received on clip 166. The strap 162 holds in place a splicing tray (or fixture) (schematically shown at 165) may be inserted. It will be appreciated by those skilled in the art that splice fixtures 165 are well known and commercially available items. Optical fiber splice fixtures are shown in U.S. Pat. Nos. 4,702,551 and 4,687,289.

In the preferred embodiment of the present invention, optical fibers do not enter tray 140 or cabinet 18 from the forward wall 130. Instead, the forward wall 130 is simply to provide an operator access to the trays 140. It is anticipated that optical fiber cables will enter through the rear wall 128. To this end, a plurality of openings 172, 174 are provided through rear wall 128. With best reference to FIG. 22, left openings 172 and right openings 174 (left and right defined with reference to the view of FIG. 22) are provided disposed in ordered pairs with each pair corresponding to a tray 140. As a result, optical fibers passing through opening 174 are passed into a tray 140. Similarly, fibers or cable passing through openings 172 are received in tray 140. The fibers meet in the center area of tray 140 and are connected by any suitable splice fixture 165 which is commercially available.

Rear wall 128 is provided with a pair of curved radius control posts 176 disposed on opposite sides of holes 172, 174. Posts 176 provide the minimum bending radius of 1.5 inches to ensure that an optical fiber passing from the exterior of cabinet 18 are bent in a slow curve around post 176 prior to entering holes 172, 174. Therefore, posts 176 prevent possible damage to the optical fibers from excess bending.

3. Storage Cabinet

In addition to cross-connect functions and splicing functions, it is anticipated that the fiber distribution frame user will need storage functions to store excess optical fiber. This final function is particularly important for the cross-connect function where the distance of required cable varies from time to time. Storage cabinets 14 are provided to take up slack in the optical fiber cables.

The storage cabinet 14 anticipated for preferred use with the present invention is shown in FIGS. 29-33. The preferred storage cabinet 14 is the subject of co-pending and commonly assigned U.S. patent application Ser. No. 07/374,008, filed June 29, 1989 and entitled "Optical Fiber Storage Container". However, the particular storage cabinet is not required and alternative designs could be used. An example of an alternative design is that shown in commonly assigned U.S. Pat. No. 4,792,203. U.S. Pat. No. 4,798,432 also teaches an optical fiber storage container.

As described more fully in the aforementioned U.S. patent application (incorporated herein by reference) the storage cabinet 14 includes sidewalls 180, 182, top wall 184, bottom wall 186 and back wall 188. Walls 180-188 cooperate to define an enclosed box structure. A partially translucent forward wall 190 is provided pivotally secured to bottom wall 186 by pivot connection 192. For purposes of design compatibility, it is desired that forward wall 190 be substantially identical to the forward walls of cabinets 16 and 18 and include a commercially available latch 194 for releasably connecting the upper edge of forward wall 190 to upper wall 184. Mounting plates 196 are provided on sidewalls 180, 182 to releasably connect the cabinet to mounting brackets 32.

Figure 29:
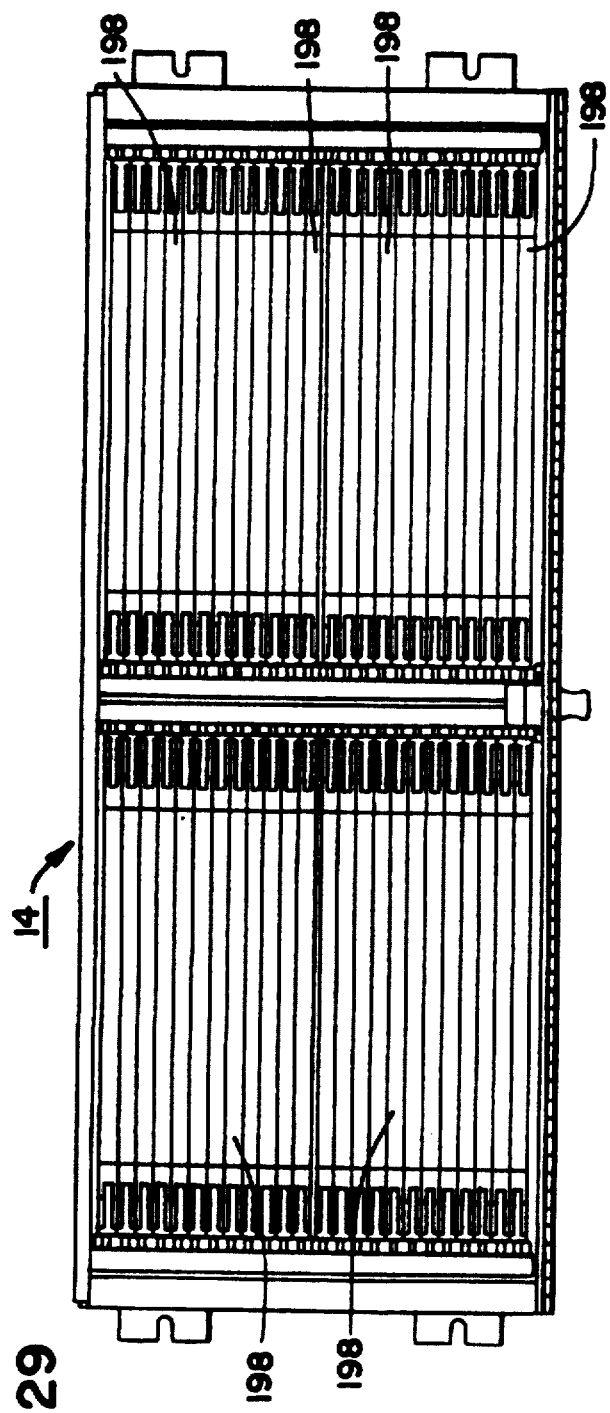
FIG. 29 is a front plan view of a fiber storage module for use with the frame of the present invention.
Figure 33:
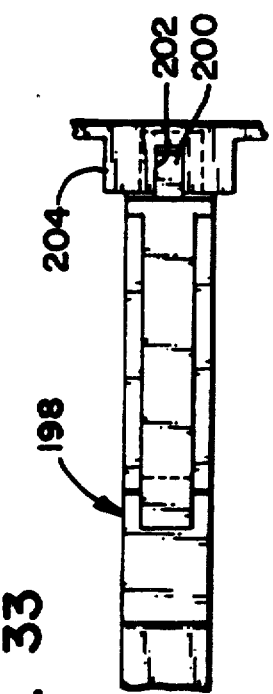
FIG. 33 is an enlarged view of a fiber storage tray of the module of FIG. 29 being mounted for sliding engagement within the module of FIG. 29.
Figure 30:
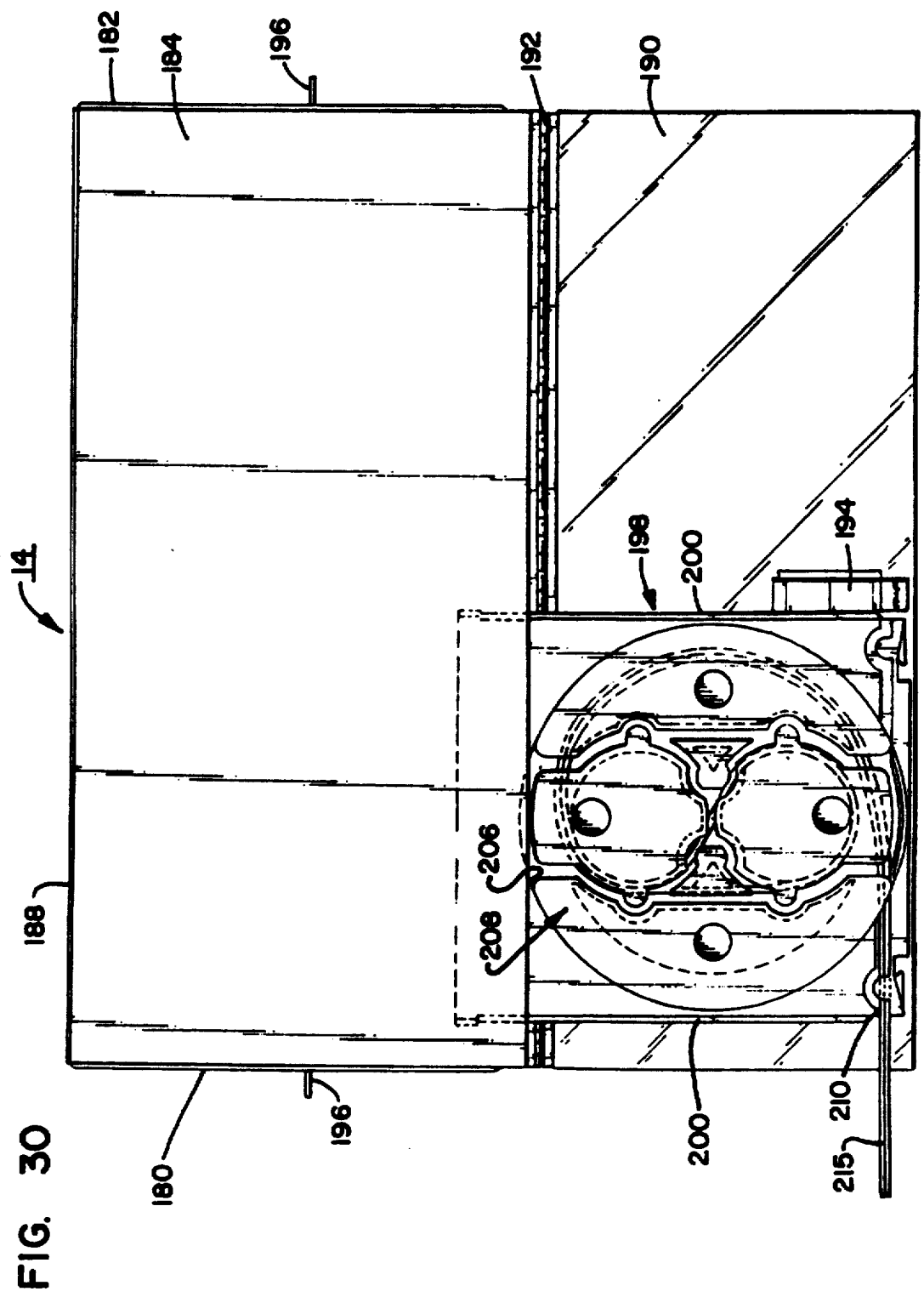
FIG. 30 is a top plan view of the module of FIG. 29 showing a fiber storage tray in an extended position.
Figure 31:
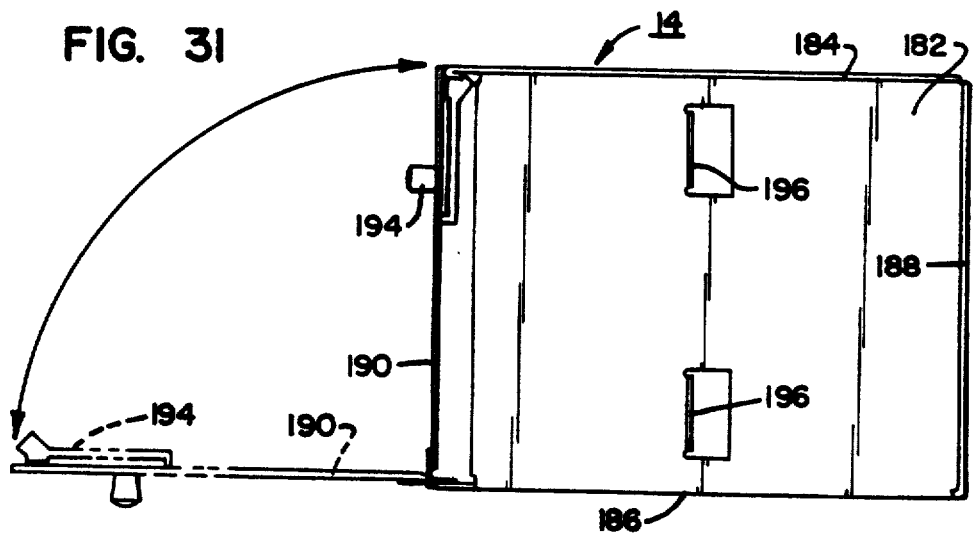
FIG. 31 is a side elevation view of the module of FIG. 29.
Figure 32:
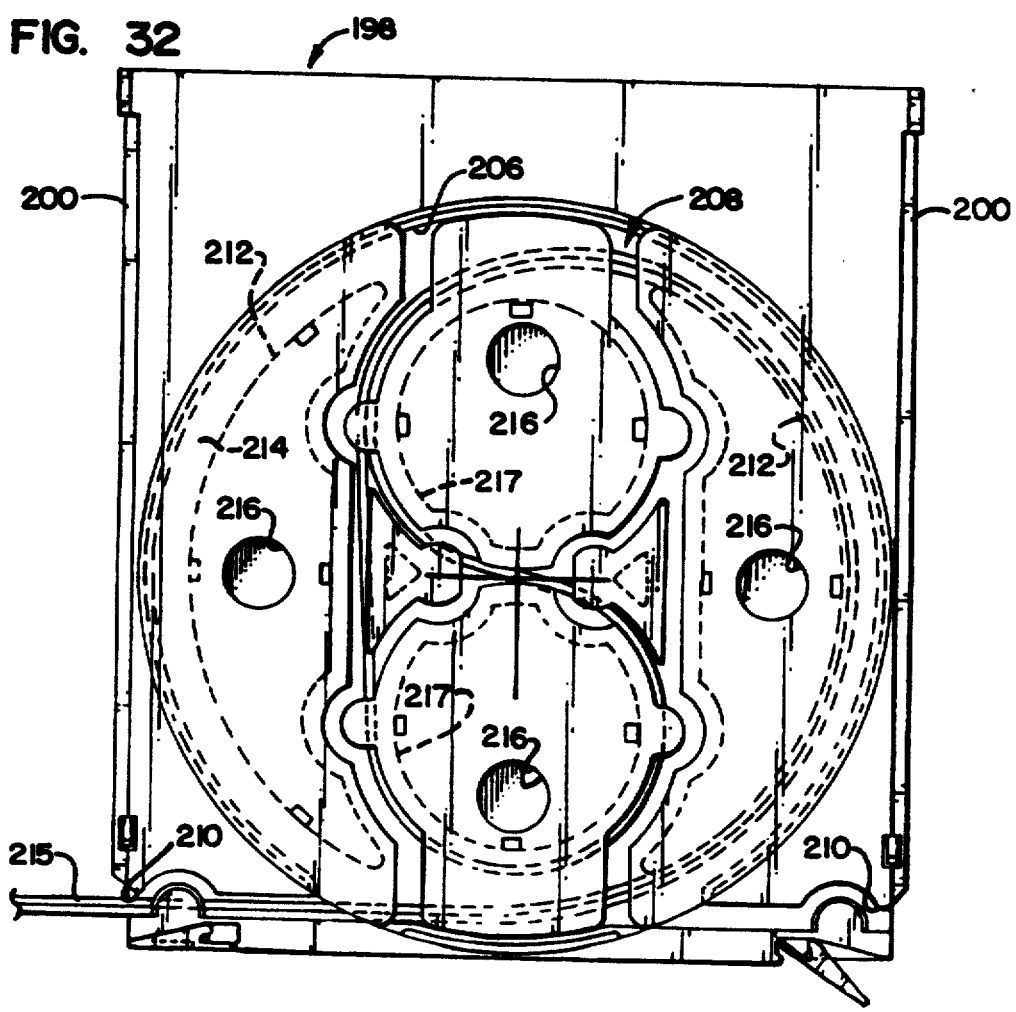
FIG. 32 is a top plan view of a fiber storage tray for use with the module of FIG. 29.

Disposed within cabinet 14 are a plurality of fiber storage trays 198. As shown in FIG. 29, the trays 198 are exposed in two vertical columns. However, it will be appreciated that this is a choice of design and any number of trays disposed in any variety of orientations would still be within the scope of the intent of the present invention.

Trays 198 include rails 200 (see FIGS. 32, 33) which are slidably received within slots 202 of slide attachments 204 connected to the sidewalls 180, 182. With best reference to FIG. 32, each of the trays is a stationary rectangular body 198 having a central circular hole 206. A spool 208 is carried within hole 206 to be rotatable within tray 198. Side passages 210 are formed through tray 198 and communicate with the spool 208. The spool 208 includes outer arcuate platforms 212 which define an outer circumferential track 214 in which optical fiber 217 may be wound. Inner platforms 214 provide an attachment loop around which the optical fiber 215 may be looped prior to being wound in the outer track 214. Thumb holes 216 are provided into which an operator may insert a finger to rotate the spool and take up or release cable from the spool.

D. Benefits Of The Invention

With the structure of the present invention, a customer can purchase a frame member 12 and select any combination of cabinets 14, 16 and 18 as desired to intermix the cabinets and their functions. Accordingly, the present invention adds many benefits and features with respect to prior art designs. Three types of modules are available: cross-connection, splicing and storage. The present invention offers flexible modular design. Also, each frame can be arranged in side-by-side alignment with other frames. Bending radius limiters are used throughout the frame. The frame accommodates future growth in a fiber network. Also, the fiber is protected from damage and snags.

From the foregoing detailed description of the present invention it has been shown of the objects of the invention have been attained in the preferred embodiment. However, modifications and equivalents of the disclosed concept such as those which readily occur to one skilled in the art are intended to be included within the scope of the invention. Accordingly, the scope of the invention is intended to be limited only by the scope of the claims which are appended hereto.

What is claimed is:

1. An optical fiber distribution frame comprising:
a frame member having walls defining a frame interior, said frame member having a plurality of cabinet attachment locations;
a plurality of cabinets sized to be received within said interior;
said plurality of cabinets including at least one connector cabinet having a panel accessible through both a rear and a forward face of said connector cabinet, said connector cabinet including a plurality of adapters each having means for attachment of said adapters to said panel, each of said adapters including means for receiving and mounting a pair of optical fibers to said adaptor with a first fibers extending through said rear face and with a second fiber extending through said forward face and with said fibers connected in optical alignment;
said plurality of cabinets also including at least one splice cabinet having splicing means for splicing together optical fibers;
said plurality of cabinets further including at least one storage cabinet having storage means for temporarily storing excess lengths of optical fibers;
each of said connector cabinets, splice cabinet and storage cabinet sized for said cabinets to be interchangeably inserted within said frame at any of said attachment locations; and
releasable attachment means for releasably attaching said cabinets to said frame at said attachment locations.

2. An optical fiber distribution frame according to claim 1 wherein said adaptors are provided with means for holding said plurality of fibers at a predetermined angle to said panel with said angle selected to be less than 90°.

3. An optical fiber distribution frame according to claim 2 wherein said connector cabinet includes openings disposed along forward side edges of said cabinet for fibers to pass through said side edges to said adaptors.

4. An optical fiber distribution frame according to claim 1 wherein a predetermined back surface of said frame member includes a plurality of fiber guides with opposing surfaces of said guides defining cable pathways and with said opposing surfaces rounded to have a radius of curvature not less than a predetermined minimum radius of curvature to prevent damage to optical fibers.

5. An optical fiber distribution frame according to claim 1 wherein said splice cabinet includes means for admitting optical fibers through a rear wall of said cabinet, said rear wall including means for controlling a radius of fiber entering said cabinet.

6. An optical fiber distribution frame according to claim 5 wherein said splice cabinet includes a plurality of trays, each of said trays including a splice fixture mounted within said tray for receiving and retaining optical fibers in predetermined alignment.

7. An optical fiber distribution frame according to claim 2 wherein said adaptors on said panel are divided into at least two fields including a first field with fibers angled to a right side of said cabinet and a second field with fibers angled to a left side.

8. An optical fiber distribution frame comprising:
a frame member having walls defining a frame interior, said frame member having a plurality of cabinet attachment locations;
a plurality of cabinets sized to be received within said interior;
said plurality of cabinets including at least one splice cabinet having means for splicing together optical fibers; and
said plurality of cabinets also including at least one storage cabinet having means for temporarily storing excess lengths of optical fibers;
said plurality of cabinets including at least one connector cabinet having a panel accessible through both a rear and a forward face of said connector cabinet, a plurality of optical fibers connections including at least a first and second design of connectors of differing known dimensions and selected to couple a pair of optical fibers, said connector cabinet including a plurality of adapters each having attachment means for attachment of said adapters to said panel, said plurality of adapters including at least a first and second design selected to receive and retain said first and second connector design, respectively;
said attachment means attaching said adapters to said panel with a first set of fibers connected to first ends of said connectors and extending from a said face and with a second set of fibers connected to second ends of said connectors and extending from said forward face; and
attachment means for releasably attaching said plurality of cabinets to said frame member at said attachment locations.

9. An optical fiber distribution frame according to claim 8 wherein said adapters are provided with means for holding said plurality of connectors at a predetermined angle to said panel with said angle selected to be less than 90°.

10. An optical fiber distribution frame according to claim 8 wherein said connector cabinet includes openings disposed along forward side edges of said cabinet for fibers to pass through said side edges to said adapters.

11. An optical fiber distribution frame according to claim 8 wherein said adapters on said panel are divided into at least two fields including a first field holding connectors angled to a right side of said cabinet and a second field holding connectors angled to a left side.

* * * * *